(12) United States Patent
Tatei

(10) Patent No.: US 11,906,179 B2
(45) Date of Patent: Feb. 20, 2024

(54) AIR CONDITIONING CONTROL DEVICE, AIR CONDITIONING CONTROL METHOD, AND PROGRAM USING VOICE CONTROL

(71) Applicant: Mitsubishi Electric Corporation, Tokyo (JP)

(72) Inventor: Shuichi Tatei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/478,583

(22) PCT Filed: Mar. 1, 2017

(86) PCT No.: PCT/JP2017/008186
§ 371 (c)(1),
(2) Date: Jul. 17, 2019

(87) PCT Pub. No.: WO2018/158894
PCT Pub. Date: Sep. 7, 2018

(65) Prior Publication Data
US 2020/0041151 A1  Feb. 6, 2020

(51) Int. Cl.
*F24F 11/30* (2018.01)
*F24F 11/58* (2018.01)
(Continued)

(52) U.S. Cl.
CPC .............. *F24F 11/30* (2018.01); *F24F 11/58* (2018.01); *F24F 11/65* (2018.01); *G05B 19/042* (2013.01); *G05B 2219/2614* (2013.01)

(58) Field of Classification Search
CPC .. F24F 11/30; F24F 11/65; F24F 11/58; F24F 11/56; F24F 11/64; G05B 19/042; G05B 2219/2614; G05B 2219/2642; G05B 15/02
See application file for complete search history.

(56) References Cited

U.S. PATENT DOCUMENTS

2008/0277486 A1\* 11/2008 Seem .................... H04L 67/125
236/49.3
2012/0158189 A1\* 6/2012 Cho .................... H04L 12/2829
700/276
(Continued)

FOREIGN PATENT DOCUMENTS

JP  H04-344049 A  11/1992
JP  H11-345024 A  12/1999
(Continued)

OTHER PUBLICATIONS

International Search Report dated May 23, 2017 issued in the corresponding International Application No. PCT/JP2017/008186 (and English translation).

(Continued)

*Primary Examiner* — Kenneth M Lo
*Assistant Examiner* — Tameem D Siddiquee
(74) *Attorney, Agent, or Firm* — POSZ LAW GROUP, PLC

(57) ABSTRACT

An air conditioning control apparatus acquires an audio signal for controlling air conditioners (outdoor units and indoor units) from a mobile terminal via the Internet. The air conditioning control apparatus specifies from among the air conditioners at least one air conditioner to be controlled based on the acquired audio signal. The air conditioning control apparatus generates control commands for controlling the specified air conditioner based on the acquired audio signal. The air conditioning control apparatus transmits the generated control commands to the specified air conditioner.

7 Claims, 5 Drawing Sheets

(51) Int. Cl.
    *F24F 11/65*   (2018.01)
    *G05B 19/042*  (2006.01)

(56) References Cited

U.S. PATENT DOCUMENTS

| | | | |
|---|---|---|---|
| 2013/0168038 A1* | 7/2013 | Ishizaka | F24F 3/065 165/11.1 |
| 2014/0330435 A1* | 11/2014 | Stoner | F24F 11/30 700/275 |
| 2015/0051739 A1* | 2/2015 | Song | G05B 15/02 700/276 |
| 2017/0004828 A1* | 1/2017 | Lee | H04L 12/2803 |
| 2017/0021693 A1* | 1/2017 | Mochizuki | B60H 1/00757 |
| 2017/0023934 A1* | 1/2017 | Dempsey | F24F 11/30 |
| 2019/0241069 A1* | 8/2019 | Bouaziz | B60K 35/00 |

FOREIGN PATENT DOCUMENTS

| | | | | |
|---|---|---|---|---|
| JP | 2000-320880 A | 11/2000 | | |
| JP | 2002-169584 A | 6/2002 | | |
| JP | 2010-266188 A | 11/2010 | | |
| JP | 2011-150606 A | 8/2011 | | |
| JP | 2016-134757 A | 7/2016 | | |
| WO | 2013/118886 A1 | 8/2013 | | |
| WO | WO2013118886 | * | 8/2013 | ............ F24F 11/56 |

OTHER PUBLICATIONS

Japanese Office Action dated Jun. 9, 2020 issued in the corresponding JP application No. 2019-502371 (and English translation).

* cited by examiner

FIG. 3
AIR CONDITIONER MANAGEMENT TABLE

| AIR CONDITIONER GROUP | OUTDOOR UNIT ID | INDOOR UNIT INFORMATION | |
|---|---|---|---|
| | | INDOOR UNIT ID | OPERATION INFORMATION |
| REFRIGERANT GROUP A | A0001 | B0001 | HEATING, PRESET TEMPERATURE 26°C, SMALL AIR VOLUME |
| REFRIGERANT GROUP A | A0001 | B0002 | HEATING, PRESET TEMPERATURE 26°C, SMALL AIR VOLUME |
| REFRIGERANT GROUP A | A0001 | B0003 | OFF |
| REFRIGERANT GROUP B | A0002 | B0004 | OFF |
| REFRIGERANT GROUP B | A0002 | B0005 | HEATING, PRESET TEMPERATURE 25°C, LARGE AIR VOLUME |
| REFRIGERANT GROUP B | A0002 | B0006 | OFF |

FIG. 4
AIR CONDITIONER SPECIFICATION TABLE

| KEYWORD | INDOOR UNIT ID |
|---|---|
| LIVING ROOM, IMA | B0001 |
| JAPANESE ROOM, WASHITSU, TOKO-NO-MA | B0002 |
| BATHROOM, FURO | B0003 |
| KID ROOM, STUDY ROOM, KODOMO, BENKYO | B0004 |
| BEDROOM, SHIN-SHITSU | B0005 |
| LIBRARY, FATHER, SHOSAI, OTOUSAN | B0006 |
| FIRST FLOOR, IKKAI | B0001~B0003 |
| SECOND FLOOR, NIKAI | B0004~B0006 |
| ALL, SUBETE | B0001~B0006 |

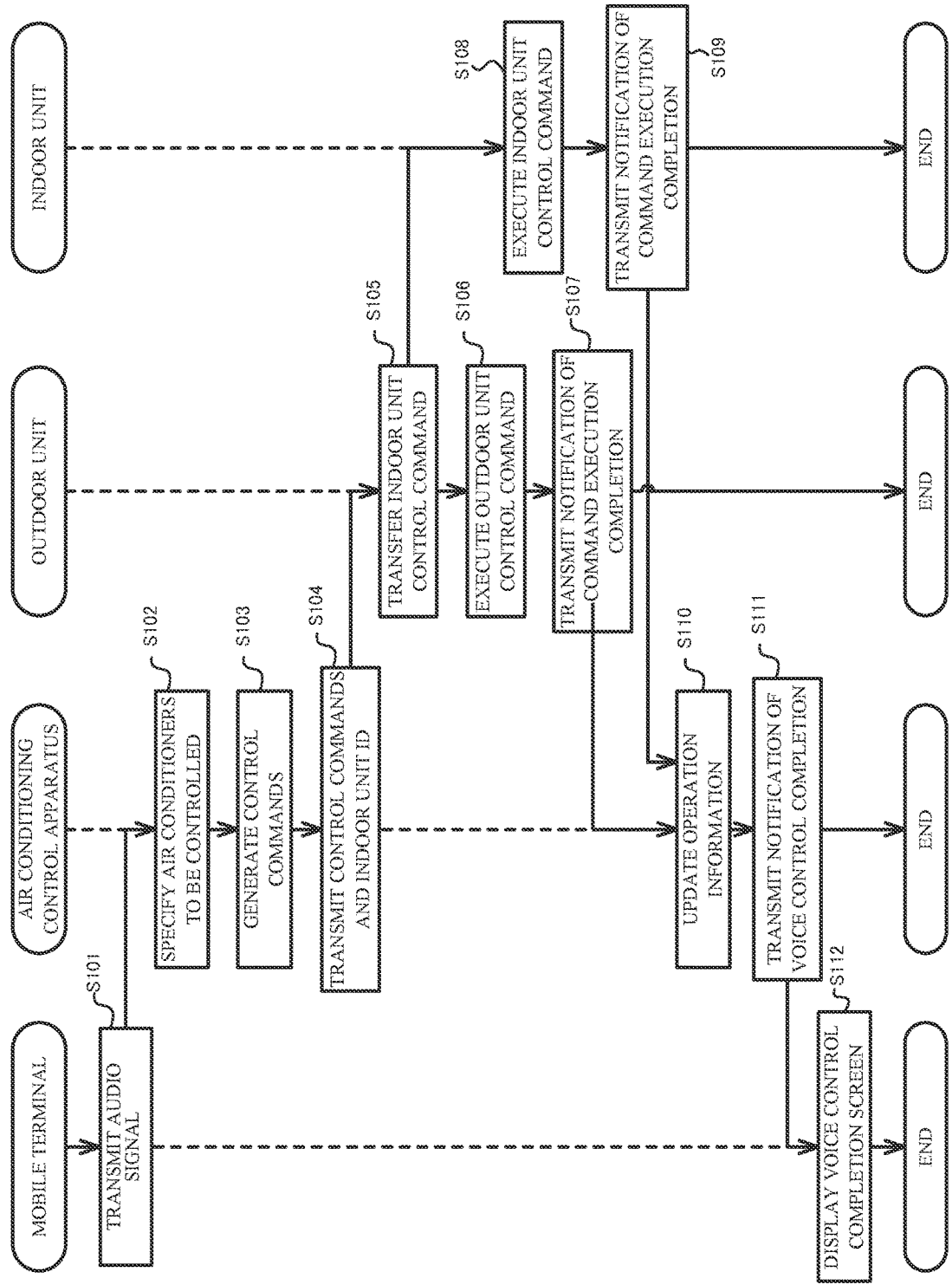

FIG. 6

AIR CONDITIONER SPECIFICATION TABLE

| PERSON | INDOOR UNIT ID |
|---|---|
| FATHER | B0006 |
| MOTHER | B0001 |
| CHILD | B0004 |
| GRANDFATHER | B0002 |

AIR CONDITIONING CONTROL DEVICE, AIR CONDITIONING CONTROL METHOD, AND PROGRAM USING VOICE CONTROL

CROSS REFERENCE TO RELATED APPLICATION

This application is a U.S. national stage application of PCT/JP2017/008186 filed on Mar. 1, 2017, the contents of which are incorporated herein by reference.

TECHNICAL FIELD

The present disclosure relates to an air conditioning control apparatus, an air conditioner control method, and a program.

BACKGROUND ART

Air-conditioning systems have been known that are capable of overall management of multiple air conditioners placed in a house, building or the like by connection to a network. A user can control operations of the individual air conditioners by manipulating a touch panel of a controller and buttons of a remote control included in the air conditioning system.

In recent years, the maximum number of air conditioners that can be connected to a network has increased. At the same time, the enhancement of performance of the air conditioners has increased the number of the functions thereof. These advances complicate the manipulation of the air conditioners, thereby impairing the user's operability of the touch panel and buttons.

Techniques of controlling air conditioners using voices are known as a technique for solving this problem. For example, Patent Literature 1 discloses a remote voice control system for controlling air conditioners via a gateway component in accordance with a voice command collected from a user by a speech input unit of a mobile communication terminal.

CITATION LIST

Patent Literature

Patent Literature 1: International Publication No. WO 2013/118886

SUMMARY OF INVENTION

Technical Problem

In the remote voice control system disclosed in Patent Literature 1, the mobile communication terminal is required to store a cross-reference table of voice commands and control commands in a memory. The mobile communication terminal is also required to convert a collected voice command into a control command with reference to this cross-reference table during the voice control. The mobile communication terminal therefore must have a relatively high throughput and a large capacity memory. That is, this voice control cannot be readily achieved by a mobile communication terminal, such as a feature phone, having low performance. In addition, Patent Literature 1 does not clearly disclose a procedure of specifying an air conditioner as a target of voice control to perform the voice control in the remote voice control system in the case of installation of multiple air conditioners that belong to mutually different refrigerant groups.

An objective of the disclosure, which has been accomplished in view of the above situation, is to provide an air conditioning control apparatus, an air conditioner control method, and a program that enable execution of voice control of air conditioners despite the use of a terminal having relatively low performance and can achieve appropriate voice control of air conditioners even in the case of installation of multiple air conditioners.

Solution to Problem

In order to achieve the above objective, an air conditioning control apparatus according to the present disclosure includes: a voice acquirer configured to acquire an audio signal for controlling air conditioners from a mobile terminal; an air conditioner specifier configured to specify from among the air conditioners at least one air conditioner to be controlled based on the acquired audio signal; a command generator configured to generate control commands for executing, based on the acquired audio signal, control of the at least one air conditioner specified by the air conditioner specifier; and a command transmitter configured to transmit, to the at least one air conditioner specified by the air conditioner specifier, the control commands generated by the command generator.

Advantageous Effects of Invention

The present disclosure can achieve a technique of enabling execution of voice control of air conditioners using a terminal having relatively low performance. The present disclosure can also achieve appropriate voice control of air conditioners even in the case of installation of multiple air conditioners.

BRIEF DESCRIPTION OF DRAWINGS

FIG. 3 illustrates an example of data stored in an air conditioner management table;

FIG. 4 illustrates an example of data stored in an air conditioner specification table;

FIG. 5 is a flowchart of a voice control process; and

FIG. 6 illustrates an example of data stored in an air conditioner specification table.

DESCRIPTION OF EMBODIMENTS

Figure 1:
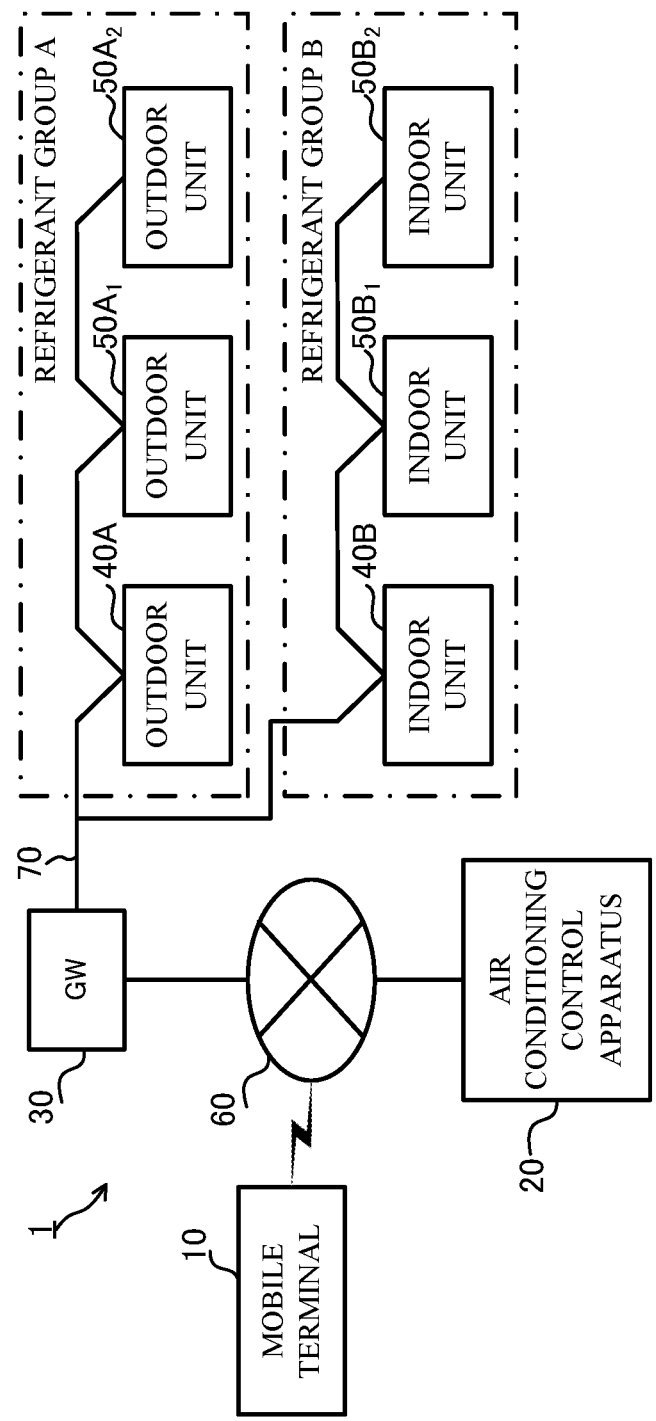
FIG. 1 illustrates the entire configuration of an air conditioning system according to an embodiment.

Embodiments of the disclosure are described below in detail with reference to the accompanying drawings. The identical or corresponding components in the drawings are provided with the same reference symbol.

An air conditioning system 1 according to an embodiment of the present disclosure is described. As illustrated in FIG. 1, the air conditioning system 1 includes a mobile terminal 10, an air conditioning control apparatus 20, a gateway (GW) 30, and air conditioners (outdoor units 40A and 40B and indoor units $50A_1$, $50A_2$, $50B_1$, and $50B_2$). The air conditioning control apparatus 20 is connected to the mobile terminal 10 via the Internet 60. Alternatively, the air conditioning control apparatus 20 may be connected to a network such as a local area network (LAN) or a wide area network (WAN), instead of the Internet 60. The air conditioning control apparatus 20 is also connected to the outdoor units 40A and 40B via the Internet 60, the GW 30, and transmission lines 70. The outdoor unit 40A is connected to the indoor units $50A_1$ and $50A_2$ via the transmission lines 70. The outdoor unit 40B is connected to the indoor units $50B_1$ and $50B_2$ via the transmission lines 70. In a case in which the outdoor units 40A and 40B are not distinguished from each other in the following description, the outdoor units 40A and 40B may also be referred to as "outdoor units 40". In addition, in a case in which the indoor units $50A_1$, $50A_2$, $50B_1$, and $50B_2$ are not distinguished from one another in the following description, the indoor units $50A_1$, $50A_2$, $50B_1$, and $50B_2$ may also be referred to as "indoor units 50".

The outdoor unit 40A and the indoor units $50A_1$ and $50A_2$ are coupled to each other with a single refrigerant pipe (not shown) and configure a refrigerant group A. In contrast, the outdoor unit 40B and the indoor units $50B_1$ and $50B_2$ are coupled to each other with a single refrigerant pipe (not shown) that is different from the refrigerant pipe of the refrigerant group A, and configure a refrigerant group B.

The mobile terminal 10 is a terminal, such as a feature phone or a smartphone. The mobile terminal 10 includes a central processing unit (CPU), a memory, a microphone, a speaker, a touch panel, a liquid crystal monitor, and a communication interface for connection to the Internet 60. The mobile terminal 10 collects an audio signal emitted from a user for controlling air conditioners using the microphone and transmits the collected audio signal to the air conditioning control apparatus 20 via the Internet 60.

Figure 2:
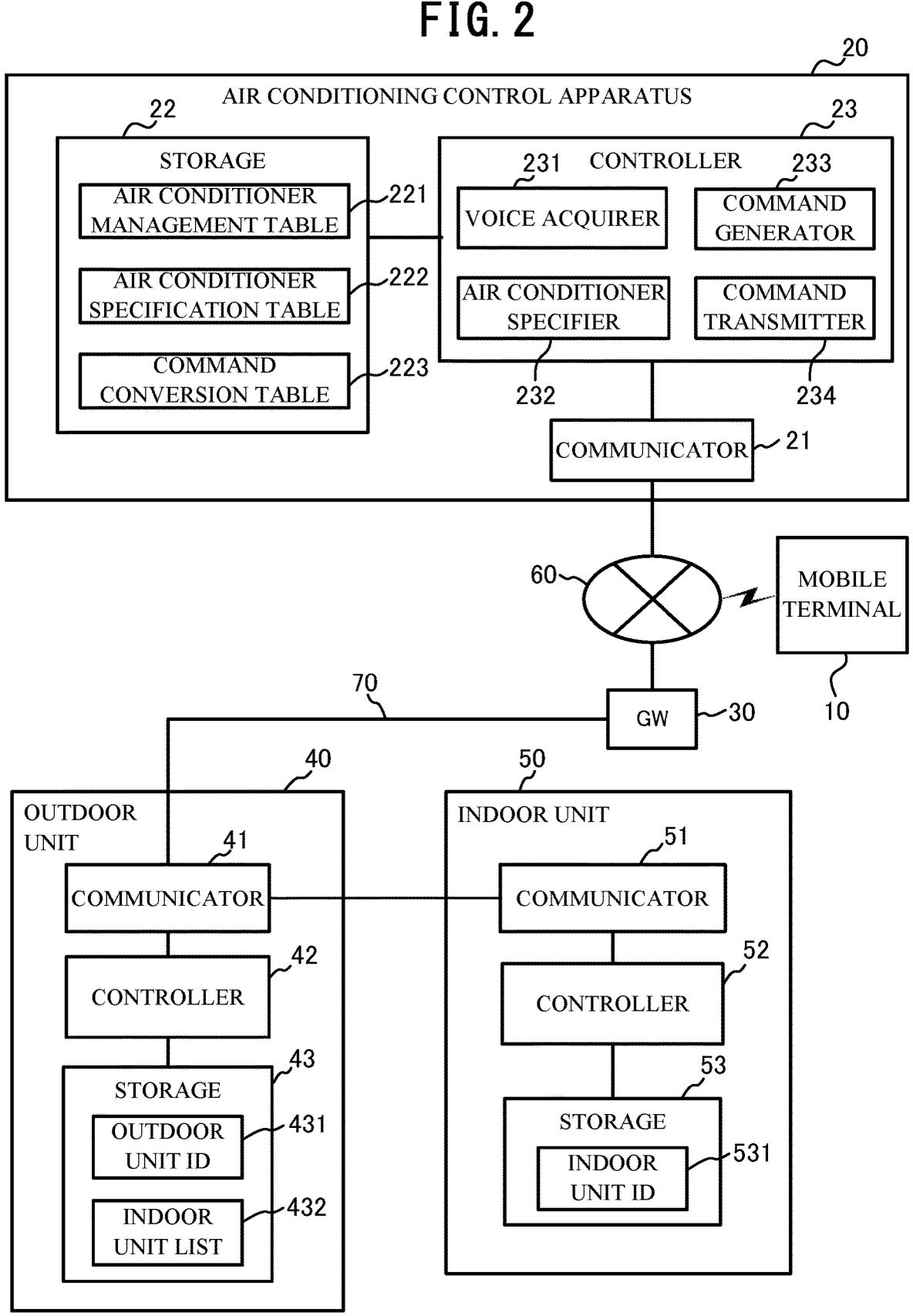
FIG. 2 illustrates the internal configurations of individual apparatuses included in the air conditioning system according to the embodiment.

The air conditioning control apparatus 20 performs overall management (monitoring and control) of the air conditioners (the outdoor units 40 and the indoor units 50). The configuration of the air conditioning control apparatus 20 is described with reference to FIG. 2. FIG. 2 illustrates the internal configurations of the individual apparatuses included in the air conditioning system 1 illustrated in FIG. 1. FIG. 2 only illustrates one of the outdoor units 40 and one of the indoor units 50 for the purpose of simplification. The air conditioning control apparatus 20 includes a communicator 21, a storage 22, and a controller 23, as illustrated in FIG. 2.

The communicator 21 is provided with, for example, a network interface card (NIC). The communicator 21 is a communication interface for connecting the air conditioning control apparatus 20 to the Internet 60.

The storage 22 functions as a so-called secondary storage (auxiliary storage). Examples of the storage 22 include a non-volatile read-write flash memory and a hard disk drive. The storage 22 stores programs executed by the controller 23 and various types of data. The storage 22 also stores an air conditioner management table 221, an air conditioner specification table 222, and a command conversion table 223.

Information on each of the outdoor units 40A and 40B and the indoor units $50A_1$, $50A_2$, $50B_1$, and $50B_2$ that are managed by the air conditioning control apparatus 20 is registered in the air conditioner management table 221. Specifically, as illustrated in FIG. 3, for each of the refrigerant groups A and B, identification information (an outdoor unit ID and indoor unit IDs) on the outdoor unit and the indoor units that belong to the refrigerant group and information indicating operating states of these indoor units are registered in the air conditioner management table 221 in association with one another.

The air conditioner specification table 222 is a table in which information for specifying the air conditioner (indoor unit 50) to be controlled based on the audio signal received from the mobile terminal 10 is registered. Specifically, as illustrated in FIG. 4, keywords contained in the audio data received from the mobile terminal 10 and indoor unit IDs of the indoor units 50 to be controlled that correspond to these keywords are registered in the air conditioner specification table 222 in association with each other. For example, as illustrated in FIG. 4, if the received audio signal contains a keyword, such as "living room" or "ima", the indoor unit 50 identified by the indoor unit ID "B0001" is found to be a control target. If the received audio signal contains a keyword, such as "all" or "subete", all the indoor units 50 identified by the indoor unit IDs "B0001" to "B0006" involved in the air conditioning system 1 are found to be control targets.

The command conversion table 223 stores a rule or cross-reference for generating, from the audio signal received from the mobile terminal 10, control commands for controlling the air conditioners based on the audio signal. In this embodiment, the control commands are categorized into two types, that is, outdoor unit control commands for controlling the outdoor units 40 and indoor unit control commands for controlling the indoor units 50.

Referring back to FIG. 2, the controller 23 includes a CPU, a read only memory (ROM) that stores programs, such as an operating system, and a random access memory (RAM) that serves as a work area. The controller 23 executes the programs stored in the storage 22 and the ROM and thus controls the entire air conditioning control apparatus 20.

The controller 23 includes, as a functional configuration, a voice acquirer 231, an air conditioner specifier 232, a command generator 233, and a command transmitter 234.

The voice acquirer 231 acquires from the communicator 21 the audio signal for controlling the air conditioners that is transmitted from the mobile terminal 10 via the Internet 60.

The air conditioner specifier 232 refers to the air conditioner specification table 222 and specifies the air conditioners (outdoor unit 40 and indoor unit 50) to be controlled based on the audio signal acquired by the voice acquirer 231.

The command generator 233 refers to the command conversion table 223 and generates control commands (an outdoor unit control command and an indoor unit control command) for controlling the specified air conditioners (outdoor unit 40 and indoor unit 50) based on the audio signal acquired by the voice acquirer 231.

The command transmitter 234 transmits the control commands generated by the command generator 233 to the air conditioner (outdoor unit 40) specified by the air conditioner specifier.

The GW 30 relays data to be transmitted and received between the air conditioning control apparatus 20 connected to the Internet 60 and the outdoor units 40 connected to the transmission lines 70 after converting the data into protocols for the corresponding networks. Alternatively, the outdoor units 40 and the indoor units 50 may be connected directly to the Internet 60 without using the GW 30.

The outdoor units 40 are placed at outdoor sites. Each of the outdoor units 40 includes a compressor and a fan (which are not shown) and has functions as a typical outdoor unit. The outdoor unit 40 also includes a communicator 41, a controller 42, and a storage 43.

The communicator 41 is an interface connected to the transmission lines 70. The communicator 41 is connected to the GW 30 and the indoor units 50 that belong to the same refrigerant group via the transmission lines 70.

The controller 42 includes a CPU, a ROM, and a RAM and controls the entire outdoor unit 40. The controller 42 executes the outdoor unit control command received from the air conditioning control apparatus 20 and thus performs the process in accordance with the instructions in the audio signal. The controller 42 controls the communicator 41 to transfer the indoor unit control command received from the air conditioning control apparatus 20 to the indoor unit 50.

The storage 43 is, for example, a non-volatile flash memory. The storage 43 stores an outdoor unit ID 431 for identifying this outdoor unit 40 and an indoor unit list 432. The indoor unit list 432 is a list of the indoor unit IDs and addresses of the indoor units 50 coupled to this outdoor unit 40 (that is, the indoor units 50 that belong to the same refrigerant group as this outdoor unit 40).

The indoor units 50 are placed in individual rooms inside the building for which the air conditioning system 1 performs air conditioning. Each of the indoor units 50 includes a fan and a heat exchanger and has functions as a typical indoor unit. Each of the indoor unit 50 includes a communicator 51, a controller 52, and a storage 53.

The communicator 51 is an interface connected to the transmission lines 70. The communicator 51 is connected to the outdoor unit 40 that belongs to the same refrigerant group via the transmission lines 70.

The controller 52 includes a CPU, a ROM, and a RAM and controls the entire indoor unit 50. The controller 52 executes the indoor unit control command received from the outdoor unit 40 and thus performs the process in accordance with the instructions in the audio signal.

The storage 53 is, for example, a non-volatile flash memory. The storage 53 stores an indoor unit ID 531 for identifying this indoor unit 50.

Subsequently, operations in a voice control process of transmitting an audio signal from the mobile terminal 10 and controlling air conditioners is explained with reference to the flowchart of FIG. 5.

A user activates an application for the voice control process by manipulating the mobile terminal 10 and emits an audio signal for controlling air conditioners. This audio signal is collected by the microphone of the mobile terminal 10. The audio signal is, for example, an utterance stating that "Heat the living room at a preset temperature of 26° C.". Upon collecting the audio signal by the microphone, the controller of the mobile terminal 10 transmits this audio signal to the air conditioning control apparatus 20 via the Internet 60 (Step S101).

The controller 23 of the air conditioning control apparatus 20 acquires the audio signal from the mobile terminal 10 and then specifies the air conditioners (outdoor unit 40 and indoor unit 50) to be controlled based on this audio signal (Step S102).

Specifically, the controller 23 analyzes the acquired audio signal using a publically-known voice analysis method to determine a word contained in the audio signal. If the determined word matches any of the keywords registered in the air conditioner specification table 222, the controller 23 specifies the indoor unit 50 associated with the keyword as a control target. The controller 23 then refers to the air conditioner management table 221 and specifies the outdoor unit 40 that belongs to the same refrigerant group as the specified indoor unit 50 as a control target.

Subsequently, the controller 23 then refers to the command conversion table 223 and generates control commands for controlling the specified air conditioners based on the acquired audio signal (Step S103). Specifically, the controller 23 generates an outdoor unit control command to be executed in the specified outdoor unit 40 and an indoor unit control command to be executed in the specified indoor unit 50.

Subsequently, the controller 23 transmits, to the outdoor unit 40 specified in Step S102, the generated control commands (outdoor unit control command and indoor unit control command) and the indoor unit ID of the indoor unit 50 specified in Step S102 (Step S104).

The controller 42 of the outdoor unit 40 transmits the indoor unit control command received from the air conditioning control apparatus 20 to the indoor unit 50 indicated by the received indoor unit ID (Step S105). The controller 42 then executes the outdoor unit control command received from the air conditioning control apparatus 20 (Step S106). The outdoor unit 40 thus performs the process in accordance with the user's instructions in the audio signal.

After completion of execution of the outdoor unit control command, the controller 42 of the outdoor unit 40 transmits, to the air conditioning control apparatus 20, a notification of command execution completion that indicates completion of execution of the outdoor unit control command (Step S107). The process in the outdoor unit 40 is then terminated.

In contrast, the controller 52 of the indoor unit 50, which receives the indoor unit control command transferred from the outdoor unit 40 in Step S105, executes this indoor unit control command (Step S108). The indoor unit 50 thus performs the process in accordance with the user's instructions in the audio signal.

After completion of execution of the indoor unit control command, the controller 52 of the indoor unit 50 transmits, to the air conditioning control apparatus 20, a notification of command execution completion that indicates completion of execution of the indoor unit control command (Step S109). In practice, the notification of command execution completion is transmitted to the air conditioning control apparatus 20 via the outdoor unit 40 since the indoor unit 50 is not directly connected to the air conditioning control apparatus 20. The process in the indoor unit 50 is then terminated.

When the controller 23 of the air conditioning control apparatus 20 receives the notifications of command execution completion from both of the outdoor unit 40 and the indoor unit 50, the controller 23 replaces the operation information on the indoor unit 50 registered in the air conditioner management table 221 by operation information reflecting the operation mode after execution of the control commands (outdoor unit control command and indoor unit control command) (Step S110). Alternatively, the controller 23 may update the operation mode immediately after the transmission of the control commands and the indoor unit ID (Step S104) without waiting for reception of the notifications of command execution completion.

The controller 23 of the air conditioning control apparatus 20 then transmits, to the mobile terminal 10 that transmitted the audio signal, a notification of voice control completion that indicates completion of voice control of the air conditioners (Step S111). The process in the air conditioning control apparatus 20 is then terminated.

After reception of the notification of voice control completion, the controller of the mobile terminal 10 causes the liquid crystal monitor to display a voice control completion screen that indicates completion of voice control (Step S112). Alternatively, the controller of the mobile terminal 10 may cause the speaker to emit a voice indicating completion of voice control. The voice control process is then terminated.

As described above, the air conditioning control apparatus 20 specifies the air conditioners (outdoor unit 40 and indoor unit 50) to be controlled and generates control commands based on the received audio signal according to the embodiment. The mobile terminal 10 therefore needs only a basic function of collecting and transmitting an audio signal. That is, voice control of air conditioners can be executed despite the use of a mobile terminal 10 having relatively low performance.

Furthermore, the air conditioning control apparatus 20 specifies the air conditioners to be controlled based on the audio signal acquired from the mobile terminal 10 according to the embodiment. The air conditioning control apparatus 20 can thus specify the desired air conditioners and execute appropriate voice control even if the air conditioning system 1 includes many air conditioners.

In addition, the air conditioning control apparatus 20 specifies the indoor unit 50 to be controlled based on the audio signal acquired from the mobile terminal 10 and also specifies the outdoor unit 40 to be controlled that belongs to the same refrigerant group as this indoor unit 50 according to the embodiment. The air conditioning control apparatus 20 then generates an outdoor unit control command and an indoor unit control command for the specified outdoor unit 40 and indoor unit 50, respectively. Accordingly, the air conditioning control apparatus 20 can control the outdoor unit 40 and the indoor unit 50 independently from each other using different control commands and can thus execute appropriate voice control of the air conditioners.

The above embodiment should not be construed as limiting the scope of the disclosure and is certainly allowed to be modified within the gist of the present disclosure in various manners.

For example, the air conditioners included in the air conditioning system 1 include the outdoor unit 40A and the indoor units $50A_1$ and $50A_2$, which belong to the refrigerant group A, and the outdoor unit 40B and the indoor units $50B_1$ and $50B_2$, which belong to the refrigerant group B, in the above embodiment. Alternatively, the disclosure may also be applied to the air conditioning system 1 that involves a larger number of outdoor units 40 and indoor units 50.

Although the air conditioner (indoor unit 50) to be controlled is specified using the air conditioner specification table 222 illustrated in FIG. 4 in the above embodiment, the air conditioner may also be specified by various procedures. For example, the storage 22 of the air conditioning control apparatus 20 may store an air conditioner specification table 222 illustrated in FIG. 6. This air conditioner specification table 222 stores indoor unit IDs of the indoor units 50 in association with persons. The controller 23 of the air conditioning control apparatus 20 may determine the person who is a source of the audio signal acquired from the mobile terminal 10 based on a voice print of the audio signal, retrieve the indoor unit ID associated with the determined person with reference to the air conditioner specification table 222 illustrated in FIG. 6, and then specify the indoor unit 50 identified by the retrieved indoor unit ID as the control target. For example, if the person who is a source of the audio signal is determined to be "Father", the controller 23 specifies the indoor unit 50 identified by the indoor unit ID "B0006" as the control target.

The program executed by the air conditioning control apparatus 20 in the above embodiments may be applied to an existing computer so that the computer functions as the air conditioning control apparatus 20 according to the disclosure.

This program may be distributed by any method. For example, the program may be recorded on a non-transitory computer-readable recording medium, such as a compact disk read-only memory (CD-ROM), a digital versatile disk (DVD), a magneto optical disk (MO), or a memory card, and then distributed. Alternatively, the program may be distributed via a communication network, such as the Internet 60.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure can be appropriately applied to a computer that manages multiple air conditioners placed in a house or building, for example.

REFERENCE SIGNS LIST

1 Air-conditioning system
10 Mobile terminal
20 Air conditioning control apparatus
21 Communicator
22 Storage
221 Air conditioner management table
222 Air conditioner specification table
223 Command conversion table
23 Controller
231 Voice acquirer
232 Air conditioner specifier
233 Command generator
234 Command transmitter
30 Gateway (GW)
40 (40A, 40B) Outdoor unit
41 Communicator
42 Controller
43 Storage
431 Outdoor unit ID
432 Indoor unit list
50 ($50A_1$, $50A_2$, $50B_1$, $50B_2$) Indoor unit
51 Communicator
52 Controller
53 Storage
531 Indoor unit ID
60 Internet
70 Transmission line

The invention claimed is:

1. An air conditioning control apparatus comprising:
a voice acquirer configured to acquire an audio signal for controlling a plurality of air conditioners from a mobile terminal;
a central processing unit configured to
specify the plurality of air conditioners to be controlled based on the acquired audio signal;
store, for each of two or more refrigerant groups, an air conditioner management table in which pieces of identification information on a single outdoor unit and one or more indoor units are registered in association with each other, the one outdoor unit and the one or more indoor units belonging to the refrigerant group;

store an air conditioner specification table that identifies a plurality of people and correlates one of the plurality of indoor units with each of the respective plurality of people;

generate control commands for executing, based on the acquired audio signal, control of the plurality of air conditioners specified by the central processing unit; and transmit, to the plurality of air conditioners specified by the central processing unit, the control commands generated by the central processing unit, wherein the plurality of air conditioners to be controlled are selected from a group of indoor units and outdoor units arranged into the two or more refrigerant groups such that each of the two or more refrigerant groups includes a single outdoor unit selected from the group of indoor units and outdoor units and at least one of the indoor units selected from the group of indoor units and outdoor units, wherein the two or more refrigerant groups are identified by one or more keywords, respectively, such that each of the two or more refrigerant groups is uniquely identified by one of the one or more keywords, wherein the central processing unit specifies, as the plurality of air conditioners to be controlled, the one or more indoor units associated with a selected refrigerant group from the two or more refrigerant groups identified by a selected keyword contained in the acquired audio signal and the single outdoor unit belonging to the selected refrigerant group, wherein the central processing unit
  identifies a person who is a source of the acquired audio signal,
  identifies an indoor unit correlated with the identified person based on the stored air conditioner specification table,
  identifies an outdoor unit belonging to an identical refrigerant group to the identified indoor unit based on the air conditioner management table, and
  specifies the identified indoor unit and outdoor unit as one of the plurality of air conditioners to be controlled, and wherein the air conditioner specification table identifies a plurality of people and uniquely correlates one of the plurality of indoor units with each of the respective plurality of people.

2. The air conditioning control apparatus according to claim 1, wherein the command generator generates an outdoor unit control command to be executed in the outdoor unit specified by the central processing unit and an indoor unit control command to be executed in the indoor unit specified by the central processing unit.

3. An air conditioner control method comprising:
  specifying a plurality of air conditioners to be controlled based on an acquired audio signal;
  storing, for a plurality of refrigerant groups, an air conditioner management table in which pieces of identification information on one or more outdoor units and a plurality of indoor units are registered in association with each other, the one or more outdoor units and the plurality of indoor units belonging to the plurality of refrigerant groups;
  storing an air conditioner specification table that identifies a plurality of people and correlates one of the plurality of indoor units with each of the respective plurality of people;
  acquiring an audio signal for controlling a plurality of air conditioners from a mobile terminal;
  identifying a person who is a source of the acquired audio signal;
  identifying an indoor unit correlated with the identified person based on the stored air conditioner specification table;
  identifying an outdoor unit belonging to an identical refrigerant group to the identified indoor unit based on the air conditioner management table,
  specifying the identified indoor unit and outdoor unit as one of the plurality of air conditioners to be controlled
  specifying an air conditioner correlated with the identified person as one of the plurality of air conditioners to be controlled based on the stored air conditioner specification table,
  specifying, as the plurality of air conditioners to be controlled, the one or more indoor units associated with a selected refrigerant group from the two or more refrigerant groups identified by a selected keyword contained in the acquired audio signal and the single outdoor unit belonging to the selected refrigerant group,
  generating control commands for executing, based on the acquired audio signal, control of the plurality of specified air conditioners; and
  transmitting, to the plurality of specified air conditioners, the control commands generated by the central processing unit,
  wherein the plurality of air conditioners to be controlled are selected from a group of indoor units and outdoor units arranged into the two or more refrigerant groups such that each of the two or more refrigerant groups includes a single outdoor unit selected from the group of indoor units and outdoor units and at least one of the indoor units selected from the group of indoor units and outdoor units,
  wherein the two or more refrigerant groups are identified by one or more keywords, respectively, such that each of the two or more refrigerant groups is uniquely identified by one of the one or more keywords,
  wherein the air conditioner specification table identifies a plurality of people and uniquely correlates one of the plurality of indoor units with each of the respective plurality of people.

4. A non-transitory computer-readable recording medium storing a program for causing a computer to function as:
  a voice acquirer configured to acquire an audio signal from a mobile terminal;
  a storage configured to
    store, for a group of indoor units and outdoor units arranged into two or more refrigerant groups such that each of the two or more refrigerant groups includes a single outdoor unit selected from the group of indoor units and outdoor units and at least one of the indoor units selected from the group of indoor units and outdoor units, an air conditioner management table in which pieces of identification information on the plurality of indoor units and outdoor units are registered in association with each other, and store an air conditioner specification table that identifies a plurality of people and correlates one of the plurality of indoor units with each of the respective plurality of people;

an air conditioner specifier configured to specify a plurality of air conditioners to be controlled based on the acquired audio signal;

a command generator configured to generate control commands for executing control of the plurality of air conditioners specified by the air conditioner specifier based on the acquired audio signal;

a command transmitter configured to transmit, to the plurality of air conditioners specified by the air conditioner specifier, the control commands generated by the command generator; and an identifier that identifies a person who is a source of the acquired audio signal, identifies an indoor unit correlated with the identified person based on the stored air conditioner specification table, and identifies an outdoor unit belonging to an identical refrigerant group to the identified indoor unit based on the air conditioner management table, wherein the plurality of air conditioners to be controlled are selected from the group of indoor units and outdoor units arranged into the two or more refrigerant groups such that each of the two or more refrigerant groups includes a single outdoor unit selected from the group of indoor units and outdoor units and at least one of the indoor units selected from the group of indoor units and outdoor units, and wherein the air conditioner specifier identifies a person who is a source of the acquired audio signal and specifies an air conditioner correlated with the identified person as one of the plurality of air conditioners to be controlled based on the stored air conditioner specification table, wherein the two or more refrigerant groups are identified by one or more keywords, respectively, such that each of the two or more refrigerant groups is uniquely identified by one of the one or more keywords, wherein the air conditioner specifier specifies, as the plurality of air conditioners to be controlled, the one or more indoor units associated with a selected refrigerant group from the two or more refrigerant groups identified by a selected keyword contained in the acquired audio signal and the single outdoor unit belonging to the selected refrigerant group, wherein the air conditioner specifier specifies the identified indoor unit and outdoor unit as one of the plurality of air conditioners to be controlled, and wherein the air conditioner specification table identifies a plurality of people and uniquely correlates one of the plurality of indoor units with each of the respective plurality of people.

5. The air conditioning control apparatus according to claim 1, wherein the central processing unit is configured to identify the person who is the source of the acquired audio signal based on a voice print of the audio signal.

6. The non-transitory computer-readable recording medium according to claim 4, wherein the air conditioner specifier identifies the person who is the source of the acquired audio signal based on a voice print of the audio signal.

7. The air conditioner control method according to claim 3, wherein the identifying of the person who is the source of the acquired audio signal is accomplished based on a voice print of the audio signal.

\* \* \* \* \*